# United States Patent [19]
Mahoney et al.

[11] 3,884,799
[45] May 20, 1975

[54] REFORMING WITH PLATINUM-RHENIUM-SELENIUM CATALYSTS

[75] Inventors: John A. Mahoney, Park Forest South, Ill.; Albert L. Hensley, Jr., Munster, Ind.

[73] Assignee: Standard Oil Company, Chicago, Ill.

[22] Filed: Dec. 11, 1972

[21] Appl. No.: 314,133

[52] U.S. Cl. ............ 208/139; 252/439; 208/138
[51] Int. Cl. ............................................ C10g 35/08
[58] Field of Search ............ 208/138, 139; 252/439

[56] References Cited
UNITED STATES PATENTS
| | | | |
|---|---|---|---|
| 2,851,399 | 9/1958 | Brennan et al. | 208/138 |
| 3,434,960 | 3/1969 | Jacobson et al. | 208/138 |
| 3,793,183 | 2/1974 | Mahoney et al. | 208/139 |

*Primary Examiner*—Delbert E. Gantz
*Assistant Examiner*—Juanita M. Nelson
*Attorney, Agent, or Firm*—James L. Wilson; Arthur G. Gilkes; William T. McClain

[57] ABSTRACT

A novel catalytic composition comprises a Group VIII metal, rhenium, and selenium deposited on a solid catalytic support comprising a refractory inorganic oxide. The preferred Group VIII metal is platinum and the preferred inorganic oxide is catalytically active alumina. This catalyst may be used in a process for reforming petroleum hydrocarbon fractions. The reforming process comprises contacting a petroleum hydrocarbon fraction in a reforming zone under reforming conditions and in the presence of hydrogen with the novel catalyst to obtain high octane blending components. In this process, the catalyst need not receive a sulfur pretreatment either prior to initial operation or after each regeneration of the catalyst. Advantageously, neither sulfiding of the catalyst nor sulfur distribution on the catalyst need be considered.

8 Claims, 2 Drawing Figures

△  Pt—Cl—Al$_2$O$_3$  CATALYST
⊡  Pt—Cl—Se—Al$_2$O$_3$  CATALYST
▽  Pt—Re—Cl—S—Al$_2$O$_3$  CATALYST
⊙  Pt—Re—Cl—Se—Al$_2$O$_3$  CATALYST 3,884,799

REFORMING WITH PLATINUM-RHENIUM-SELENIUM CATALYSTS

BACKGROUND OF THE INVENTION

This invention is related to the conversion of petroleum hydrocarbon streams. More particularly, it is related to the reforming of petroleum hydrocarbon fractions over alumina-supported catalysts containing platinum and rhenium.

One of the important petroleum refining processes that are employed to provide high-octane number hydrocarbon blending components for gasoline is the reforming process. In the typical reforming process, aromatics are produced by means of (1) the dehydrogenation of 6-carbon-member-ring naphthenes, (2) isomerization of 5-carbon-member rings to 6-carbon-member rings and the subsequent dehydrogenation of the 6-carbon-member rings, and (3) the dehydrocyclization of paraffinic hydrocarbons to aromatics.

Petroleum napthas and gasoline-boiling-range hydrocarbons are converted in the typical reforming process in the presence of various catalysts. Typical of these catalysts are chromium-oxides-on-alumina catalysts, molybdenum-oxides-on-alumina catalysts, and platinum-halogen-on-alumina catalysts. Today, the catalysts that are most often employed in the reforming process by the petroleum refining industry are the platinum-halogen-on-alumina catalysts.

In recent years, improvements have been made in the platinumcontaining reforming catalyst field. For example, U.S. Pat. No. 3,415,737 is directed to a platinum-containing catalyst, which also contains a small amount of rhenium. This patent teaches that the catalyst must be pre-sulfided or sulfided initially while on stream to minimize the initial high hydrocracking activity which is obtained with the catalyst. The pre-sulfiding treatment of a platinum-rhenium reforming catalyst is also taught in U.S. Pat. No. 3,434,960.

One of the disadvantages that accompanies the use of a catalyst that comprises platinum, halogen, and rhenium on an oxide support is the excessive hydrocracking that occurs when the catalyst, either fresh or regenerated, is first employed in the reforming process. As pointed out hereinabove, sulfiding of the catalyst minimizes this deleterious effect related to such a catalyst. However, if the sulfiding is not done properly or if it is not done uniformly throughout the catalyst bed, the excessive hydrocracking will still occur. The catalytic composition of the present invention eliminates this disadvantage.

Now it has been found that reforming of petroleum fractions can be carried out with a catalyst that contains both platinum and rhenium without conducting an initial sulfiding treatment of the catalyst. The catalytic composition is a novel catalyst. It not only contains platinum and rhenium, but also contains a small amount of selenium.

U.S. Pat. No. 2,851,399 considers a reforming catalyst containing platinum and selenium on a catalytically active alumina; however, it does not suggest that selenium, when incorporated into a catalytic composition containing both a Group VIII metal rhenium, will eliminate the need for a pre-sulfiding treatment of that particular catalyst to minimize the initial high hydrocracking activity of that particular catalyst. It does not disclose that such a catalyst will provide suitable activity, selectivity, activity maintenance, and selectivity maintenance when employed to reform petroleum hydrocarbon streams.

SUMMARY OF THE INVENTION

Broadly, according to the present invention, there is provided a new and a novel catalytic composition for the reforming of petroleum hydrocarbon streams. This catalyst comprises a Group VIII metal, rhenium, and a small amount of selenium deposited on a solid catalytic support comprising a refractory inorganic oxide. The catalyst may contain a Group VIII metal in an amount of about 0.1 to about 5 weight percent, rhenium in an amount of about 0.1 to about 5 weight percent, and selenium in an amount that is at least 0.005 weight percent, each quantity being based upon the total weight of the catalyst. The catalyst may also contain combined halogen.

In addition, according to the present invention, there is provided an improved process for catalytically reforming a petroleum hydrocarbon fraction to produce a much higher octane number product. This improved process comprises contacting the petroleum hydrocarbon fraction in a reforming zone under reforming conditions and in the presence of hydrogen with the catalytic composition of the present invention.

BRIEF DESCRIPTION OF THE DRAWINGS

Two figures accompany this specification.

DESCRIPTION AND PREFERRED EMBODIMENTS

The highly mechanized society of today requires an increasing demand for motor fuels having very high octane numbers. The reforming of petroleum hydrocarbon fractions comprises one of the sources of such high octane numbers.

The improved process of the present invention provides an excellent means for upgrading the octane number of a petroleum hydrocarbon fraction. This improved process employs a new and novel catalytic composition, which comprises a Group VIII metal, rhenium, and selenium on a solid support comprising a refractory inorganic oxide. The process, in its broadest form, comprises contacting a petroleum hydrocarbon fraction in a reforming zone under reforming conditions and in the presence of hydrogen with the catalyst of the present invention.

The catalyst of the present invention provides the following advantages: (1) the catalyst, whether fresh or regenerated, need not be sulfided prior to use and (2) there is no sulfur-distribution problem. In addition, as shown hereinbelow, a substantial amount of selenium is retained on the catalyst after the catalyst has been subjected to an appreciable number of simulated regeneration cycles.

The catalytic composition that is employed in the process of the present invention is a new and a novel catalytic composition. This catalyst comprises a Group VIII metal, rhenium, and selenium deposited on a solid catalytic support comprising a refractory inorganic oxide. This catalyst may also contain a combined halogen.

A suitable Group VIII metal is a Group VIII noble metal and the preferred Group VIII noble metal is platinum. While the Group VIII metal may be present in an amount from about 0.1 to about 5 weight percent, it is preferably present in an amount of about 0.1 to about 2 weight percent, based on the weight of the catalyst. The rhenium may be present in an amount that is equivalent to the amount of Group VIII metal in the catalyst. If the catalyst contains a combined halogen, the combined halogen will be present in a small amount. Preferably, the combined halogen is chlorine and is present in an amount within the range of about 0.1 to about 5 weight percent, based on the weight of the catalyst. Selenium may be present in the catalyst in a small amount as selenium, a selenium compound, or other selenium-containing substances. Suitably, the selenium is present in an amount of at least 0.005 weight percent, based on the weight of the catalyst and calculated as the element. As much as 0.1 weight percent selenium may be employed.

The catalytic composition of the present invention comprises a solid catalytic support. This support may comprise a refractory inorganic oxide, such as catalytically active alumina, titania, boria, silica, or mixtures thereof. The solid catalytic support should be a porous support having a surface area of at least 50 square meters per gram. The surface area may be as large as 700 square meters per gram, or more. The preferred solid catalytic support is catalytically active alumina. Such alumina may have a surface area as large as 800 square meters per gram, or more, and an average pore diameter within the range of about 30 Angstroms (A) to about 300 A. Preferably, the alumina may have a surface area of about 150 square meters per gram to about 500 square meters per gram and an average pore diameter of about 100 A to about 200 A.

The catalytic composition of the present invention is prepared by incorporating the metals with the carrier at any particular step of the catalyst preparation. The metals may be incorporated onto the support while the support material is in the form of a sol or gel. The metal-containing material can then be precipitated. On the other hand, the solid catalytic support can be in the form of a dried and/or calcined solid upon which soluble compounds of the metals are impregnated, individually or conjointly, the impregnated material being dried and/or calcined subsequently.

When the catalyst is to contain a combined halogen promoter, particularly fluorine or chlorine, the combined halogen may be added to the solid catalyst support at any point during the preparation of the catalyst prior to or following the incorporation of the platinum, rhenium, and selenium into the composition. Alternatively, the halogen may be added to the solid catalyst support or carrier during the impregnation of the support with the metals. An example of this latter technique is represented by the impregnation of the support with chloroplatinic acid.

A reforming catalyst that contains platinum and rhenium on an alumina support is well known in the art, as shown by U.S. Pat. Nos. 3,415,737 and 3,434,960. As pointed out in each of these patents, a reforming catalyst containing platinum and rhenium is sulfided initially to reduce or minimize the initial excessive hydrocracking activity that will occur with such a catalyst, when it is either a fresh catalyst or a regenerated catalyst. If excessive hydrocracking occurs when the reforming run is initiated, reduced liquid yields occur as a result of the formation of large amounts of light hydrocarbon gases and coke. The catalyst may be sulfided during its preparation, prior to being used for reforming, or the sulphur may be added to the system during the initial period of the reforming run. Suitable sulfur-containing compounds, such as hydrogen sulfide or dimethyldisulfide, are employed for this sulfiding treatment. Such sulfiding techniques are not infallible and are difficult to control in such a way as to permit a uniform distribution of sulfur, which will result in a uniform reduction in hydrocracking activity for the initial operation and subsequent operations following regeneration of the catalyst.

The above disadvantage is eliminated by the new and novel catalytic composition of the present invention. The selenium can be applied to and distributed over the catalyst to provide a catalyst having a selected amount of selenium. A substantial amount of the selenium is retained by the catalyst during the subsequent use of the catalyst for reforming and during subsequent reduction and oxidation steps employed in regeneration of the catalyst. The selected amount of selenium will provide a desirable uniform control of the excessive hydrocracking activity at the start of each reforming run, whether the catalyst is employed as a fresh catalyst or a recently regenerated catalyst. The selenium minimizes the excessive initial hydrocracking activity of the catalyst and, of course, reduces the formation of coke at this point of the run. The catalyst need not be retreated with selenium after each regeneration. This is a great advantage, since the use of sulfur to control the initial excessive hydrocracking activity of a platinum-and-rhenium-containing catalyst requires that the regenerated catalyst be sulfided prior to the use of that regenerated catalyst for reforming.

The process of the present invention is a process for the reforming of a petroleum hydrocarbon fraction. Such petroleum hydrocarbon fraction is a petroleum distillate which boils in the range of about 70°F. to about 500°F. and, preferably, from about 180°F. to about 430°F. The petroleum hydrocarbon fraction may be a straight-run naptha, a thermally-cracked naphtha, a catalytically-cracked naphtha, a hydrogenated naphtha, a hydrocarbon fraction boiling in the gasoline boiling range, or a blend of two or more of these feeds. The gasoline boiling range comprises temperatures of about 120°F. to about 420°F., preferably, about 140°F. to about 380°F. The feedstock should contain substantially no nitrogen and only a very small amount of sulfur, that is, no more than 10 ppm, and, preferably, less than 1 to 2 ppm sulfur. Since many of the above feedstocks may contain appreciable amounts of nitrogen and sulfur compounds, which are deleterious to the catalyst, it is preferred that such feedstocks be subjected to a suitable hydrodesulfurization and/or hydrodenitrogenation treatment, such as hydrofining, prior to use in the process of the present invention in order to reduce both the sulfur and nitrogen levels to tolerable limits. The hydrofining process may be carried out over a suitable sulfur-resistant catalyst, such a catalyst containing the oxides and/or sulfides of cobalt and molybdenum on an alumina support, at suitable hyrofining conditions.

The process of the present invention is a process for reforming a petroleum hydrocarbon fraction, which process comprises contacting said hydrocarbon fraction in a reforming zone under reforming conditions and in the presence of hydrogen with the catalytic composition of the present invention. Reforming conditions that may be employed in the process of the present invention comprise an inlet temperature of about 750°F. to about 1100°F., a total pressure of about 50 psig to about 1,000 psig, a weight hourly space velocity (WHSV) of about 0.1 to about 10 weight units of hydrocarbon per hour per weight unit of catalyst, and a recycle gas rate of about 1,000 standard cubic feet of gas per barrel of hydrocarbon (SCFB) to about 20,000 SCFB. Generally the recycle gas is at least 75 volume percent hydrogen. Preferred reforming conditions that are employed in the process of the present invention comprise an inlet temperature of about 800°F. to about 1050°F., a total pressure of about 50 psig to about 400 psig, a WHSV of about 0.5 to about 5 weight units of hydrocarbon per hour per weight unit of catalyst, and a recycle gas rate of about 2,000 SCFB to about 10,000 SCFB.

As in the typical reforming process, the catalyst of the present invention becomes coated or covered with a layer of carbonaceous material, referred to as coke. This layer or coating of coke results in a large reduction in the activity of the reforming catalyst. Consequently, the catalyst must be regenerated periodically, such period of time being dependent upon the severity of the reforming operation. When the conditions of the reforming operation are more severe, the lay-down or production of coke is more rapid. Typically, regeneration of the catalyst is achieved by stripping the catalyst of any liquid hydrocarbons with an inert gas, burning the coke from the catalyst by the use of controlled amounts of an oxygen-containing gas, and reducing the catalyst in a hydrogen-containing atmosphere prior to use of the regenerated catalyst for the reforming of the petroleum hydrocarbon stream.

The catalyst of the present invention may be used in a fixed bed or beds. In such case, the catalyst would be in the form of either pellets or extrudates. However, the catalyst could be employed in a moving bed type of operation. In addition, the catalyst could be employed in one or more fluidized beds of finely-divided catalyst particles.

Today, the typical reforming reactor system, in general, employs fixed beds of catalyst and comprises three or more reactors connected in series. Each reactor, which contains one or more beds of catalyst, may be preceded by a heater to heat the materials entering the reactor to a prescribed temperature. If the system is a regenerative reforming system, a swing reactor is employed. When the catalyst in a particular reactor has been deactivated, that reactor is removed from the reforming system and the catalyst therein is regenerated. The reactor is replaced by the swing reactor, and this replacement enables the reforming process to continue in operation, even though the catalyst in the removed reactor is being regenerated. Such reforming operation is often identified as cyclic reforming.

As pointed out above, the catalytic composition of the present invention can be regenerated without being detrimentally affected by the regeneration treatment. Hence, the process of the present invention may be a regenerative or cyclic reforming process.

Figure 1:
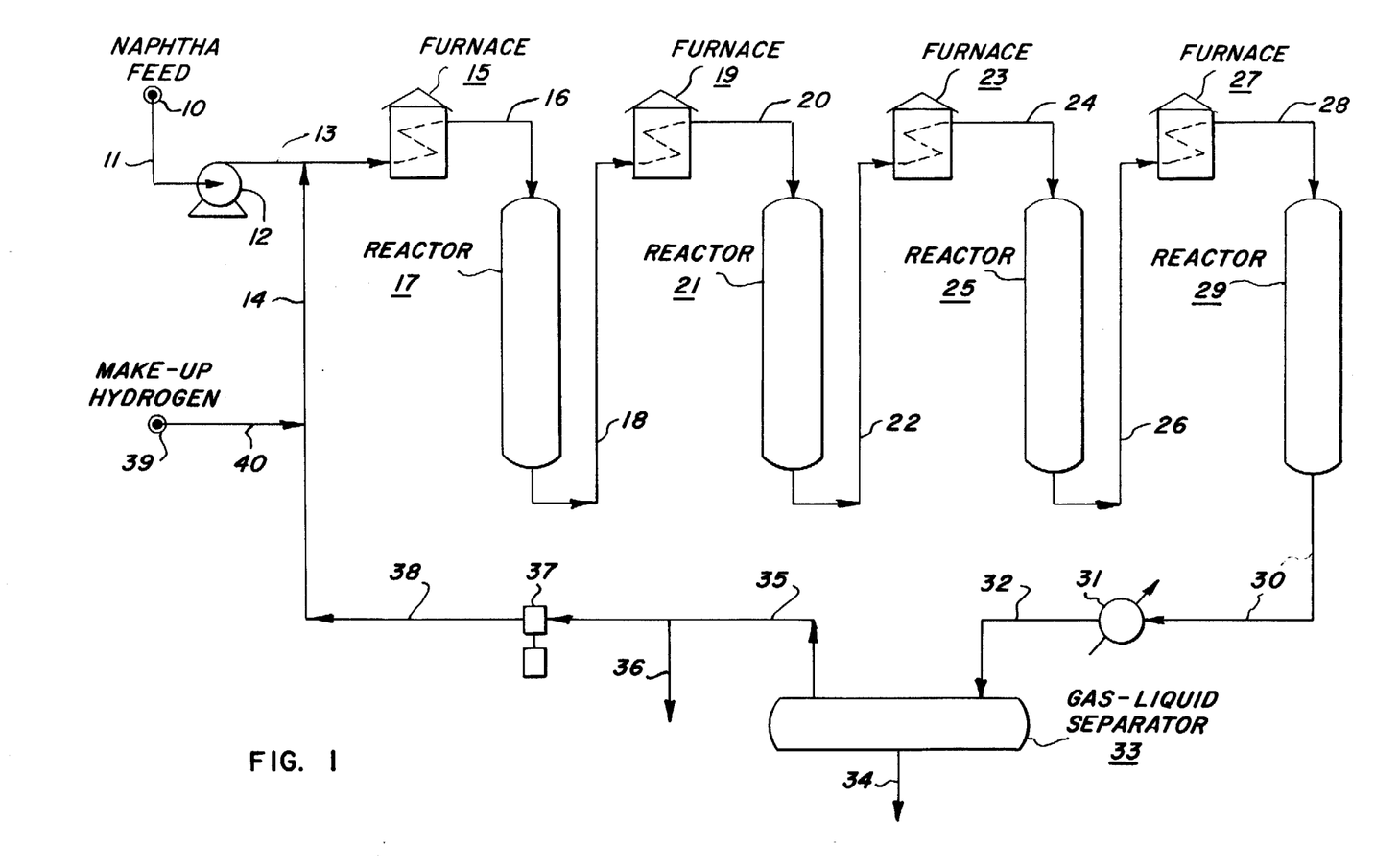
FIG. 1 presents a simplified schematic flow diagram of a preferred embodiment of the process of the present invention.

A preferred embodiment of the present invention is depicted in the accompanying FIG. 1. FIG. 1 is a simplified schematic flow diagram of this preferred embodiment. It does not include certain auxiliary equipment, such as heat exchangers, valves pumps compressors and associated equipment, which would be needed in various places along the flow path of the process in addition to the pump and compressor that are depicted in the drawing. Such additional auxiliary equipment and its location requirements would be quickly recognized by one having ordinary skill in the art. Therefore, such equipment is not shown in FIG. 1.

In the embodiment represented in FIG. 1, a naphtha heart cut, having a boiling range of about 160°F. to about 400°F., preferably about 180°F. to 380°F., is obtained from source 10. This feedstock is passed from source 10 through line 11 into pump 12, which pumps the hydrocarbon through line 13. Hydrogen-containing recycle gas is introduced into line 13 via line 14 to be mixed with the hydrocarbons in line 13. The hydrogen-hydrocarbon mixture passes through line 13, furnace 15, and line 16 into the top of reactor 17. The material is introduced into reactor 17 at a temperature of about 940°F. The pressure in reactor 17 is within the range of about 200 psig to about 210 psig. The effluent from reactor 17, having an outlet temperature of about 760°F., passes through line 18, furnace 19, and line 20 into the top of reactor 21. Sufficient feed is introduced into this hydrogen-hydrocarbon stream by furnace 19 so that the temperature at the inlet of reactor 21 is approximately 960°F. The outlet temperature of reactor 21 is approximately 860°F. The pressure in reactor 21 is within the range of about 190 psig to about 200 psig. The effluent from reactor 21 passes through line 22, furnace 23, and line 24 into the top of reactor 25. The effluent is heated in furnace 23 so that the inlet temperature to reactor 25 is about 980°F. The pressure in reactor 25 is within the range of about 180 psig to about 190 psig. The effluent from reactor 25, having an outlet temperature of about 950°F., passes through line 26, furnace 27, and line 28 into the top of reactor 29. The inlet temperature of reactor 29 is about 980°F. The pressure in reactor 29 is within the range of about 170 psig to about 180 psig.

Each of the reactors contains a catalyst comprising about 0.5 weight percent platinum, 0.5 weight percent rhenium, 0.03 weight percent selenium, and 0.6 weight percent combined chlorine on a catalytically active gamma-alumina. The catalyst is present in each reactor as 1/16-inch extrudates.

Not shown in FIG. 1 is an additional reactor, which contains the same type of catalyst. This additional reactor is employed as a swing reactor and is used to replace any of the other four reactors, when a particular reactor is being regenerated.

The hydrogen-to-hydrocarbon ratio and the WHSV that are employed in this embodiment fall within their respective ranges of values as specified hereinabove.

The effluent from reactor 29 passes through line 30, water cooler 31, and line 32 into gas-liquid separator 33. Gas-liquid separator 33 is operated at a pressure of about 150 psig to about 170 psig and a temperature of about 100°F. Liquid product is removed from separator 33 through line 34 to be sent to a suitable product recovery system, from which the high-octane-number product is obtained. Gaseous material is removed from separator 33 through line 35. A portion of this gas is removed from the system through line 36 to be used in other refinery units. The remainder of this hydrogen-hydrocarbon gas in line 35 is compressed by compressor 37 to be sent through lines 38 and 14 as hydrogen-containing recycle gas. When necessary, make-up-hydrogen-containing gas may be introduced into the system from source 39 via line 40.

The following examples are presented for the purpose of illustration only and are not intended to limit the scope of the present invention.

EXAMPLE I

In this example, a catalyst containing 0.56 weight percent platinum, 0.51 weight percent rhenium, and 0.79 weight percent combined chlorine on a gamma-alumina catalyst support was manufactured by and obtained from the American Cyanamid Company. This catalyst is hereinafter identified as Catalyst A.

A 15-gram portion (25 cubic centimeters) of Catalyst A (14–20-mesh material) was charged to a reactor that had been fabricated from a ½-inch schedule 80 Hasteloy pipe. The length of the reactor was 40 inches. The bed of Catalyst A contained 25 cubic centimeters of the catalyst and occupied a space of about 7 inches midway along the length of the reactor. The catalyst bed was supported by 16 inches of 1/16-inch Heli-Pak 3012 stainless steel packing and the upper or preheat section of the reactor was filled with 4 inches of Heli-Pak stainless steel packing. The temperature along the length of the catalyst bed was measured by means of a co-axial thermowell. The effective cross-sectional area of the reactor was about 1.42 square centimeters. The reactor was surrounded by electrically-heated wire.

The reactants, Feedstock No. 1 and hydrogen, the latter being in recycle gas, were passed down-flow through the reactor of this small-scale laboratory test unit and the effluent from the reactor was passed through a gas-liquid separator. The liquid was passed through a pressure reducing valve and was collected in a flask that was cooled by freezing water. A portion of the uncondensed gas was recycled while the remainder was passed into an ice trap, a sampling bomb, and subsequently through a wet test meter. The properties of Feedstock No. 1 are presented hereinbelow in Table I.

TABLE I

| Feedstock No. | FEEDSTOCK PROPERTIES | | |
|---|---|---|---|
| | 1 | 2 | 3 |
| Gravity, °API | 56.7 | 56.4 | 53.5 |
| Unleaded Research Octane No. | 52.1 | 55.0 | 48.7 |
| Hydrocarbon type, Vol.% | | | |
| Paraffins | 51.8 | 50.7 | 48.0 |
| Naphthenes | 35.5 | 35.2 | 40.4 |
| Aromatics | 12.7 | 14.1 | 11.6 |
| ASTM Distillation, °F. | | | |
| IBP | 140 | 138 | 172 |
| 10% | 220 | 218 | 222 |

TABLE I – Continued

| Feedstock No. | FEEDSTOCK PROPERTIES | | |
|---|---|---|---|
| | 1 | 2 | 3 |
| 30% | 242 | 238 | 246 |
| 50% | 256 | 253 | 276 |
| 70% | 270 | 270 | 310 |
| 90% | 296 | 290 | 350 |
| EBP | 352 | 320 | 390 |

The average catalyst bed temperature was raised to approximately 700°F. Bottled oxygen was passed over the catalyst for 1 hour at 700°F., atmospheric pressure, and a low flow rate. The reactor was blocked in overnight with the catalyst being maintained in an oxygen atmosphere. The following morning, the reactor system was purged with flowing nitrogen for about 5 minutes at atmospheric pressure and at a low flow rate. The unit was then pressured with hydrogen to a pressure of 200 psig and hydrogen was passed through the system at a flow rate of approximately 1 cubic foot per hour for 1-½ hours. After this reduction treatment, 566 cubic centimeters of a gaseous mixture comprising 8 volume percent hydrogen sulfide in hydrogen was added to the reactor system over a period of 10 minutes. The average catalyst bed temperature during this sulfiding treatment was approximately 705°F. If all the sulfur had been adsorbed on the catalyst, the catalyst would have contained 0.43 weight percent sulfur. The feedstock was then introduced into the reactor system at a WHSV that was approximately one-half of the WHSV to be used during the test. The average catalyst bed temperature was raised at a rate of about 50°F. every 15 minutes until a temperature of 850°F. was obtained. Adjustments were made for any hot spots that developed in the catalyst bed. When the average catalyst bed temperature became 850°F., the WHSV was increased to the desired WHSV to be employed during the test. External hydrogen was turned off and recycle gas was introduced into the system. The temperature was increased at a rate of about 50°F. every 15 minutes until the desired operating average catalyst bed temperature was achieved.

The test was conducted at a liquid hourly space velocity (LHSV) of 1.69 volumes of hydrocarbon per hour per volume of catalyst (a WHSV of 2.12 weight units of hydrocarbon per hour per weight unit of catalyst). The reactor pressure was maintained at 200 psig and the catalyst bed temperature ranged from about 913°F. to about 924°F. A recycle gas rate of about 4,650 SCFB was employed. The results of this test are presented in Table II. Samples of liquid product and gas were collected during the periods of time that are designated in Table II. Gas samples and liquid samples were analyzed by gas-chromatographic techniques.

TABLE II

| Sample No. | DATA OBTAINED WITH CATALYST A | | | | | |
|---|---|---|---|---|---|---|
| | 2 | 3 | 4 | 6 | 7 | 8 |
| Time Period, Hours | | | | | | |
| Start | 3.5 | 22.5 | 41.5 | 51.5 | 71.0 | 95.0 |
| Finish | 22.5 | 41.5 | 46.5 | 71.0 | 95.0 | 118.5 |
| Temperature, °F. | 921 | 917 | 921 | 916 | 911 | 913 |
| Hydrogen Percent | | | | | | |
| In Recycle Gas | 66.9 | 73.0 | 68.7 | 65.6 | 65.6 | 65.7 |
| On Product | 2.48 | 2.76 | 2.50 | 2.18 | 2.15 | 2.10 |
| $C_5$+ Product | | | | | | |
| Vol% on Feed | 72.5 | 73.8 | 72.3 | 73.1 | 73.2 | 74.2 |
| Vol% Aromatics | 78.9 | 77.5 | 77.4 | 74.0 | 72.6 | 70.8 |
| Research Octane (unleaded) | 102.0 | 101.4 | 101.5 | 100.7 | 99.6 | 98.8 |

TABLE II -Continued

| Sample No. | DATA OBTAINED WITH CATALYST A | | | | | |
|---|---|---|---|---|---|---|
| | 2 | 3 | 4 | 6 | 7 | 8 |
| Heavy Reformate | | | | | | |
| Research Octane (unleaded) | 108.9 | 108.0 | 107.7 | 106.7 | 105.4 | 104.8 |
| Product Recovery | 103.1 | 99.6 | 101.8 | 104.4 | 103.6 | 103.4 |
| Catalyst Activity | 183 | 172 | 164 | 137 | 138 | 112 |

| Sample No. | 9 | 10 | 11 | 12 | 13 | 14 | 15 |
|---|---|---|---|---|---|---|---|
| Time Period, Hours | | | | | | | |
| Start | 118.5 | 142.5 | 147.5 | 166.5 | 171.5 | 190.5 | 195.5 |
| Finish | 142.5 | 147.5 | 166.5 | 171.5 | 190.5 | 195.5 | 214.5 |
| Temperature, °F. | 916 | 922 | 921 | 917 | 924 | 920 | 923 |
| Hydrogen Percent | | | | | | | |
| In Recycle Gas | 66.3 | 66.0 | 66.4 | 67.8 | 66.1 | — | 68.1 |
| On Product | — | 2.21 | 2.05 | 2.04 | 2.01 | — | 2.04 |
| $C_5+$ Product | | | | | | | |
| Vol% on Feed | 75.0 | 74.7 | 74.4 | 76.4 | 75.8 | — | 76.3 |
| Vol% Aromatics | 72.2 | 72.0 | 71.4 | 70.2 | 71.2 | 69.0 | 68.9 |
| Research Octane (unleaded) | 99.3 | 99.0 | 99.0 | 97.9 | 98.6 | 97.3 | 97.2 |
| Heavy Reformate | | | | | | | |
| Research Octane (unleaded) | 105.0 | 104.5 | 104.6 | 103.4 | 103.8 | 102.5 | 102.8 |
| Product Recovery | 102.2 | 102.5 | 101.7 | 101.7 | 100.9 | — | 101.3 |
| Catalyst Activity | 114 | 93 | 95 | 87 | 84 | 74 | 68 |

Relative activity values were calculated for each sample by means of an arrhen temperature-unleaded-octane-number relationship.

EXAMPLE II

A catalyst containing rhenium and selenium was prepared in the laboratory. A 100-gram portion of fresh Catalyst A was impregnated with 120 milliliters of an aqueous solution that contained 0.048 gram of $H_2SeO_4$ and 0.3 milliliter of concentrated hydrochloric acid. The impregnated material was dried in air at a temperature of 40°C. (104°F.), subsequently heated for 16 hours under a heat lamp at a temperature of about 70°C. (%°F.), and finally calcined in air for 2 hours at a temperature of 450°C. (842°F.). The calcined material, hereinafter identified as Catalyst B, was found to contain 0.56 weight percent platinum, 0.51 weight percent rhenium, 0.012 weight percent selenium, and 0.81 weight percent combined chlorine on a gamma-alumina support.

A 15-gram portion (24 cubic centimeters) of Catalyst B (14–20-mesh material) was charged to a reactor as described in Example I and tested in a unit as described in Example I. Feedstock No. 1 was employed in the test.

Air was introduced into the system at a flow rate of about 2 cubic feet per hour and the average catalyst bed temperature was raised to a temperature of about 880°F. to about 900°F. Then air was blocked in overnight. The next morning, bottled oxygen was passed through the reactor system at a temperature of about 880°F. to about 900°F. and a flow rate of about 12 cubic feet per hour. The reactor was then purged with nitrogen at atmospheric pressure and at a low flow rate for 10 minutes. Subsequently, the reactor system was pressured in hydrogen to a pressure of 200 psig and the catalyst was treated with flowing hydrogen for 1 hour and 35 minutes at a flow rate of about 0.1 of a cubic foot per minute. The reactor was cooled from 880°F. to 700°F. Feedstock was introduced into the system at a WHSV that was about one-half of the value to be used during the subsequent test. The average catalyst bed temperature was raised at a rate of about 50°F. every 15 minutes until the temperature of 850°F. was obtained. Adjustments were made for any hot spots that were observed in the catalyst bed. It is to be noted that the hot spots that were obtained with Catalyst B were of a smaller temperature differential and of a shorter duration than those obtained with the sulfided catalyst, Catalyst A. When the average catalyst bed temperature was 850°F., the WHSV was increased to the desired WHSV, external hydrogen was stopped, and recycle gas was introduced into the system. The temperature was then increased at a rate of 50°F. every 15 minutes until the operating average catalyst bed temperature was achieved.

Typical operating conditions for the test comprised an LHSV of 1.76 volumes of hydrocarbon per hour per volume of catalyst (a WHSV of 2.12 weight units of hydrocarbon per hour per weight unit of catalyst), a reactor pressure of 200 psig, an average catalyst temperature that was maintained in the range of about 916°F. to about 921°F., and a recycle gas rate of approximately 4,600 SCFB. The results of this test are presented in Table III.

TABLE III

| Sample No. | DATA OBTAINED FROM CATALYST B | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Time Period, Hrs. | | | | | | | | | | | | |
| Start | 0 | 3 | 22 | 27 | 46 | 51 | 70 | 75 | 94 | 99 | 120 | 141 |
| Finish | 3 | 22 | 27 | 46 | 51 | 70 | 75 | 94 | 99 | 120 | 141 | 166 |
| Temperature, °F. | 919 | 917 | 920 | 919 | 920 | 920 | 919 | 920 | 921 | 924 | 921 | 919 |
| Hydrogen Percent | | | | | | | | | | | | |
| In Recycle Gas | — | 66.7 | 70.0 | 76.0 | — | 77.3 | 78.1 | 77.4 | 78.2 | 77.5 | 79.3 | 78.7 |
| On Product | — | 2.68 | 2.82 | 3.02 | — | 2.93 | 2.96 | 2.91 | 2.95 | 2.93 | 2.95 | 2.86 |

TABLE III -Continued

| Sample No. | 1 | 2 | 3 | 4 | 5 | 6 | 7 | 8 | 9 | 10 | 11 | 12 |
|---|---|---|---|---|---|---|---|---|---|---|---|---|
| | | | | DATA OBTAINED FROM CATALYST B | | | | | | | | |
| C$_5$+ Product | | | | | | | | | | | | |
| Vol% on Feed | — | 70.9 | 71.7 | 75.9 | 75.4 | 76.6 | 76.4 | 76.6 | 76.8 | 76.1 | 77.7 | 77.5 |
| Vol% Aromatics | 87.4 | 86.0 | 85.4 | 83.0 | 81.8 | 80.1 | 79.3 | 79.9 | 79.2 | 79.6 | 79.1 | 77.7 |
| Research Octane (unleaded) | 104.6 | 104.7 | 104.2 | 103.5 | 102.8 | 102.5 | 102.1 | 102.2 | 102.1 | 102.2 | 101.7 | 101.2 |
| Heavy Reformate | | | | | | | | | | | | |
| Research Octane (unleaded) | 108.2 | 110.7 | 110.7 | 110.9 | 108.7 | 108.2 | 107.5 | 107.5 | 107.6 | 107.3 | 106.9 | 106.8 |
| Product Recovery | — | 100.5 | 99.0 | 98.5 | — | 100.1 | 99.7 | 100.3 | 100.3 | 100.5 | 100.6 | 97.8 |
| Catalyst Activity | — | 437 | 343 | 290 | 231 | 218 | 195 | 201 | 184 | 180 | 170 | 159 |
| Sample No. | 13 | 14 | 15 | 16 | 17 | 18 | 19 | 20 | 21 | 22 | 24 | 25 |
| Time Period, Hrs. | | | | | | | | | | | | |
| Start | 166 | 171 | 190 | 195 | 214 | 219 | 238 | 243 | 262 | — | 310 | 334 |
| Finish | 171 | 190 | 195 | 214 | 219 | 238 | 243 | 262 | 267 | — | 334 | 339 |
| Temperature, °F. | 919 | 919 | 919 | 920 | 920 | 920 | 918 | 919 | 919 | 922 | 920 | 920 |
| Hydrogen Percent | | | | | | | | | | | | |
| In Recycle Gas | 78.9 | 78.1 | 78.2 | 77.5 | 78.3 | 79.5 | 80.6 | 79.2 | 79.9 | — | 78.3 | 78.8 |
| On Product | 2.81 | 2.76 | 2.73 | 2.70 | 2.74 | 2.81 | 2.85 | 2.78 | 2.88 | — | 2.62 | 2.59 |
| C$_5$+ Product | | | | | | | | | | | | |
| Vol% On Feed | 77.9 | 78.2 | 78.1 | 78.4 | 78.2 | 78.6 | 79.4 | 78.8 | — | — | 79.5 | 79.8 |
| Vol% Aromatics | 76.7 | 76.0 | 75.9 | 76.2 | 75.8 | 75.5 | 74.8 | 74.9 | 73.9 | 74.0 | 73.4 | 72.0 |
| Research Octane (unleaded) | 100.8 | 100.7 | 100.3 | 100.6 | 100.4 | 100.4 | 99.9 | 99.9 | 99.7 | 99.8 | 99.3 | 98.6 |
| Heavy Reformate | | | | | | | | | | | | |
| Research Octane (unleaded) | 105.8 | 105.5 | 105.2 | 105.5 | 105.4 | 105.1 | 104.6 | 104.0 | 103.7 | 104.2 | 103.6 | 102.6 |
| Product Recovery | 98.6 | 99.4 | 98.6 | 100.2 | 98.1 | 98.5 | 98.0 | 100.5 | 94.6 | — | — | 100.4 |
| Catalyst Activity | 144 | 144 | 129 | 136 | 131 | 129 | 121 | 117 | 112 | 108 | 104 | 91 |

A comparison of the data in Table II and the data in Table III shows that Catalyst B, an embodiment of the catalyst of the present invention, provided a catalyst activity, an unleaded research octane number of the C$_5$+ product, an unleaded research octane number of the heavy reformate, and hydrogen yields that were superior to those obtained with Catalyst A, a typical prior-art rhenium-containing reforming catalyst. Furthermore, Catalyst A was subjected to a sulfiding pretreatment, while Catalyst B did not require such a pretreatment. In addition, the two catalysts furnished comparable activity maintenance.

EXAMPLE III

In this example, a catalyst containing 0.76 weight percent platinum, 0.51 weight percent rhenium, 0.56 weight percent combined chlorine, and 0.012 weight percent selenium on a gamma-alumina catalyst support was prepared in the laboratory. This catalyst is hereinafter identified as Catalyst C.

A quantity of a platinum-containing reforming catalyst manufactured by the American Cyanamid Company was treated with a rhenium compound to contain 0.5 weight percent rhenium. A 100-gram portion of this rhenium-containing material was then impregnated with 50 milliliters of a solution that contained 0.046 gram of H$_2$SeO$_4$ (0.025 gram of selenium). The impregnated material was then dried in static air under a heat lamp at a temperature of about 50°C. (122°F. ). The dried material was then calcined in static air for 2 hours at a temperature of 450°C. (842°F.).

A 15-gram portion (24–25 cubic centimeters) of Catalyst C (14–20-mesh material) was charged to a reactor as described in Example I and tested in a unit that is similar to the unit that is described in Example I. This catalyst was tested with Feedstock No. 2. The properties of Feedstock No. 2 are presented hereinabove in Table I.

Prior to this test, Catalyst C was subjected to the following start-up procedure.

The average catalyst temperature was raised to approximately 700°F. Bottled air was passed over the catalyst for 1 hour at 700°F., atmospheric pressure, and a low flow rate. The reactor was blocked in overnight with the catalyst being maintained in an air atmosphere. The following morning, the reactor system was purged with flowing nitrogen for about 5 minutes at atmospheric pressure and at a low flow rate. The unit was then pressured with hydrogen to a pressure of 200 psig and hydrogen was passed through the system at a flow rate of approximately 1 cubic foot per hour for 1½ hours. The feedstock was then introduced into the reactor system at a WHSV that was approximately one-half of the WHSV to be used during the test. The average catalyst temperature was raised at a rate of about 50°F. every 15 minutes until a temperature of 850°F. was obtained. Adjustments were made for any hot spots that developed in the catalyst bed. When the average catalyst temperature became 850°F., the WHSV was increased to the desired WHSV to be employed during the test. External hydrogen was turned off and recycle gas was introduced into the system. The temperature was increased at a rate of about 50°F. every 15 minutes until the desired operating average catalyst temperature was achieved.

The catalyst was then tested with Feedstock No. 2 for 72 hours, during which six product samples were obtained. The operating conditions include a LHSV of 1.76 volumes of hydrocarbon per hour per volume of catalyst (a WHSV of 2.12 weight units of hydrocarbon per hour per weight unit of catalyst), a total pressure of 200 psig, and a recycle gas rate of 4,500 SCFB. The used catalyst was then regenerated in an oxygen-containing atmosphere, and 38 cubic centimeters of chlorine gas were added to the reactor system during the regeneration treatment. The regenerated catalyst was again tested with Feedstock No. 2 and subsequently received a second regeneration treatment. Then the regenerated catalyst was tested with a heavier feedstock, Feedstock No. 3. Selected properties of Feedstock No. 3 are presented hereinabove in Table I. This heavier Feedstock No. 3 was employed to deactivate the catalyst more rapidly. The regeneration and the testing with Feedstock No. 3 were repeated one more time. In each case, the catalyst was regenerated in an oxygen-containing atmosphere and 38 cubic centimeters of chlorine gas were added to the reactor system during the regeneration treatment. The catalyst, which had now seen four regenerations, was again employed to reform the original feedstock, i.e., Feedstock No. 2. The data obtained during the first reforming test of Catalyst C and the data from the fifth reforming test are presented hereinbelow in Table IV.

EXAMPLE IV

A series of tests was performed with four different types of catalysts to determine the reforming ability of each. The four types of catalysts were: (1) a catalyst containing 0.74 weight percent platinum and 0.77 weight percent combined chlorine on an activated alumina; (2) a catalyst containing 0.74 weight percent platinum, 0.81 weight percent combined chlorine, and 0.06 weight percent selenium on an activated alumina; (3) catalysts containing 0.56 weight percent platinum, 0.51–0.56 weight percent rhenium, 0.75–0.79 weight percent combined chlorine, and 0.047–0.095 weight percent sulfur on an activated alumina; and (4) catalysts containing 0.56 weight percent platinum, 0.51 weight percent rhenium, 0.65–0.83 weight percent combined chlorine, and 0.012–0.022 weight percent selenium on an activated alumina.

Fifteen tests are included in this example. Test Nos. 3, 9, 10, and 11 were conducted in bench-scale equipment using a reactor fabricated from ⅜-inch schedule

TABLE IV

| Sample No. | 1 | 2 | 3 | 4 | 5 | 6 | 21 | 22 | 23 | 24 | 25 |
|---|---|---|---|---|---|---|---|---|---|---|---|
| DATA OBTAINED WITH CATALYST C* | | | | | | | | | | | |
| Time Period, Hrs. | | | | | | | | | | | |
| Start | 0 | 5 | 24 | 29 | 48 | 53 | 0 | 2.5 | 21.5 | 26.5 | 45.5 |
| Finish | 5 | 24 | 29 | 48 | 53 | 72 | 2.5 | 21.5 | 26.5 | 45.5 | 50.5 |
| Temperature, °F. | — | 864 | 883 | 893 | 910 | 912 | — | 870 | 883 | — | 899 |
| Hydrogen Percent | | | | | | | | | | | |
| In Recycle Gas | — | 62.7 | — | 60.1 | 57.4 | 55.8 | — | 71.6 | 71.4 | 72.4 | 70.4 |
| On Product | — | 1.71 | — | 1.71 | 1.77 | 1.69 | — | 2.12 | 2.15 | 2.17 | 2.23 |
| $C_5+$ Product | | | | | | | | | | | |
| Vol% On Feed | — | 77.4 | — | 74.2 | 70.4 | 70.0 | — | 78.3 | 78.4 | 78.9 | 77.0 |
| Vol% Aromatics | 72.7 | 67.7 | 69.5 | 72.7 | 78.4 | 78.2 | — | 72.9 | 73.1 | 72.3 | 75.2 |
| Research Octane | | | | | | | | | | | |
| (unleaded) | 99.2 | 96.9 | 97.9 | 99.6 | 101.6 | 101.5 | — | 99.1 | 99.2 | 98.9 | 100.5 |
| Heavy Reformate | | | | | | | | | | | |
| Research Octane | | | | | | | | | | | |
| (unleaded) | 103.9 | 102.0 | 102.4 | 104.5 | 107.5 | 107.2 | — | 104.6 | 104.1 | 104.8 | 106.5 |
| Product Recovery | — | 98.5 | — | 99.4 | 100.2 | 101.4 | — | 100.3 | 101.5 | 101.0 | 100.7 |
| Catalyst Activity | — | 310 | 210 | 284 | 223 | 201 | — | 375 | 265 | — | 214 |

| Sample No. | 26 | 27 | 28 | 29 | 30 | 31 | 32 | 33 | 34 | 35 | 36 |
|---|---|---|---|---|---|---|---|---|---|---|---|
| Time Period, Hrs. | | | | | | | | | | | |
| Start | 50.5 | 69.5 | 74.5 | 95.5 | 117.5 | 141.5 | 146.5 | 165.5 | 170.5 | 189.5 | 194.5 |
| Finish | 69.5 | 74.5 | 95.5 | 117.5 | 141.5 | 146.5 | 165.5 | 170.5 | 189.5 | 194.5 | 213.5 |
| Temperature, °F. | 898 | 915 | 915 | 932 | 947 | 946 | 946 | 963 | 964 | 979 | 981 |
| Hydrogen Percent | | | | | | | | | | | |
| In Recycle Gas | 71.8 | 71.1 | 71.2 | 70.5 | 68.6 | 68.5 | 68.3 | 67.2 | 69.5 | 67.9 | 67.5 |
| On Product | 2.25 | 2.42 | 2.42 | 2.53 | 2.56 | 2.43 | 2.42 | 2.42 | 2.43 | 2.35 | 2.25 |
| $C_5+$ Product | | | | | | | | | | | |
| Vol% On Feed | 77.8 | 75.9 | 75.6 | 74.4 | 72.5 | 73.6 | 73.3 | 72.9 | 73.1 | — | 73.3 |
| Vol% Aromatics | 75.4 | 79.9 | 80.5 | 82.9 | 84.6 | 82.4 | 80.6 | 84.0 | 79.4 | 79.6 | 75.8 |
| Research Octane | | | | | | | | | | | |
| (unleaded) | 100.2 | 101.7 | 102.0 | 103.2 | 104.0 | 103.1 | 102.6 | 103.4 | 102.3 | 102.4 | 100.7 |
| Heavy Reformate | | | | | | | | | | | |
| Research Octane | | | | | | | | | | | |
| (unleaded) | 106.3 | 107.6 | 108.2 | 109.3 | 114.1 | 109.3 | 108.8 | 109.3 | 108.9 | 108.5 | 106.5 |
| Product Recovery | 101.6 | 102.3 | 102.1 | 102.3 | 100.9 | 101.8 | 101.5 | 101.7 | 98.7 | 101.3 | 98.4 |
| Catalyst Activity | 210 | 195 | 208 | 182 | 165 | 129 | 112 | 93 | 70 | 49 | 34 |

*Catalyst Regenerated four times after Sample No. 6. Each regeneration was followed by reforming test. The last test starts with Sample No. 21.

These data indicate that the four regenerations did not deleteriously affect Catalyst C, an embodiment of the catalyst of the present invention. In fact, the regenerated catalyst appeared to have a higher catalytic activity than the activity of the fresh Catalyst C. Moreover, improved hydrogen yields were obtained with the regenerated catalyst. Therefore, the catalyst of the present invention can be successfully regenerated.

40 Hasteloy pipe containing a co-axial thermowell. The cross-sectional area of the pipe less the cross-sectional area of the thermowell was about 1.15 square centimeters. The length of the reactor was 40 inches. A catalyst bed of approximately 9 inches in length was supported on a 16-inch bed of 1/16-inch Heli-Pak 3012 stainless steel packing. A layer of Heli-Pak packing, approximately 6 inches in height, was placed above the catalyst bed. The 25-cubic centimeter catalyst bed contained 8.6 grams of catalyst (14–20-mesh material) diluted with 16.6 grams of 40–60-mesh Vycor. In each of the other 11 tests, the bench-scale-test-unit reactor and catalyst loading procedure described in Example I were employed.

After the catalyst had been loaded into the reactor, it was heated to a temperature of about 900°F. in a stream of air and allowed to soak in the air stream, generally over a weekend. Just prior to being brought on stream, the catalyst was soaked in oxygen at atmospheric pressure and at a temperature of 900°F. for 1 hour and cooled in a stream of dry nitrogen. The catalyst was then cooled to a temperature of 800°F., whereupon the catalyst bed was purged with a hydrogen stream and the cooling continued until a temperature of 700°F. was reached.

Hydrocarbon feed No. 1 was then introduced into a reactor at the space velocity listed. The temperature was raised 50°F. at intervals of 15 minutes. When the catalyst bed reached 850°F., but prior to the time that the bed reached 900°F., external hydrogen was turned off and hydrogen produced during the reaction was recycled. A kinetic average temperature of approximately 920°F. was maintained. Sampling was initiated three hours after hydrocarbon feed was introduced into the reactor.

In the case of those catalysts which were pretreated with hydrogen sulfide, the catalyst was pretreated with hydrogen for 1 hour at 500°C. The catalyst was held in an 8-millimeter Vycor tubular furnace. After the hydrogen pretreatment, the furnace was cooled to about 300°C. and a slug of hydrogen sulfide gas was passed through the catalyst bed. The furnace temperature was then increased to 500°C. and hydrogen was continued to flow for another 2 hours. In all cases, the hydrogen flow rate was maintained at 40 cubic centimeters per minute.

Figure 2:
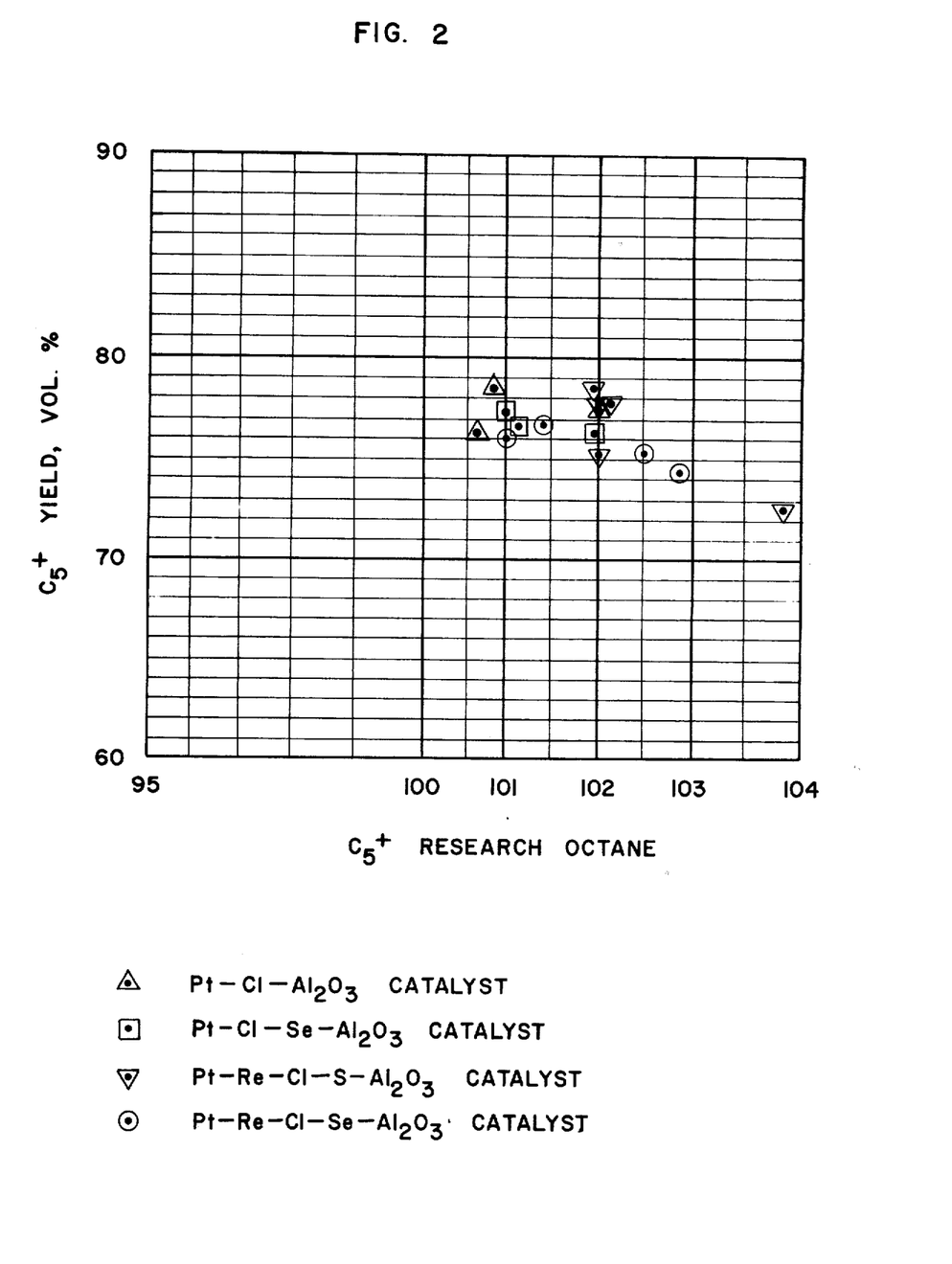
FIG. 2 presents a comparison of reforming yield data obtained with the catalyst of the present invention to yield data obtained with three other types of reforming catalysts.

The results of the above tests, provided from samples obtained from periods having a mid-point of approximately 60 hours on test, are presented in Table V. Yield data obtained from these tests are presented in FIG. 2. The data obtained indicate that a catalyst containing platinum, rhenium, and selenium provides an activity and a selectivity that is at least as good as those provided by other reforming catalysts of the prior art.

EXAMPLE V

This test was conducted to establish the degree of loss of the selenium from a reforming catalyst containing platinum, rhenium, and selenium. A series of alternate oxidizing and reducing atmospheres was employed to simulate cyclic reforming operations. At sporadic times during the test, small amounts of hydrogen sulfide, water, and chlorine gas were introduced into the system, since during commercial reforming operation the reforming catalyst would probably be exposed to these items.

A 25-gram portion of a catalyst containing 0.56 weight percent platinum, 0.51 weight percent rhenium, 0.81 weight percent combined chlorine, and 0.022 weight percent selenium on a gamma-alumina support was placed in a Vycor reactor. The reactor was inserted in a tube furnace and air was introduced into the reactor at a rate of about 50 cubic centimeters per minute. The catalyst bed was heated to and maintained at a temperature of 950°F. The schedule of treatments is presented in table VI.

TABLE V

| | TEST DATA FROM PERIODS HAVING MID-POINT AT 60 HOURS | | | | | | | | $C_5$+ YIELD, |
|---|---|---|---|---|---|---|---|---|---|
| | CAT. COMPOSITION, % | | | | | TEMP, | CAT. | | |
| TEST | Pt | Re | Cl | Se | S | °F | ACTIVITY | $C_5$+O.N. | VOL. % |
| 1 | 0.74 | — | 0.77 | — | — | 922 | 156 | 100.6 | 76.2 |
| 2 | 0.74 | — | 0.77 | — | — | 920 | 201 | 102.0 | 77.3 |
| 3 | 0.74 | — | 0.77 | — | — | 923 | 160 | 100.8 | 78.4 |
| 4 | 0.74 | — | 0.81 | 0.06 | — | 917 | 195 | 101.9 | 76.3 |
| 5 | 0.74 | — | 0.81 | 0.06 | — | 918 | 173 | 101.2 | 76.7 |
| 6 | 0.74 | — | 0.81 | 0.06 | — | 920 | 167 | 101.0 | 77.2 |
| 7 | 0.56 | 0.51 | 0.79 | — | * | 922 | 165 | 102.0 | 75.2 |
| 8 | 0.56 | 0.51 | 0.79 | — | * | 924 | 251 | 103.8 | 72.5 |
| 9 | 0.56 | 0.51 | 0.75 | — | 0.078 | 922 | 198 | 102.1 | 77.8 |
| 10 | 0.56 | 0.51 | 0.75 | — | 0.047 | 919 | 207 | 102.0 | 77.6 |
| 11 | 0.56 | 0.51 | 0.75 | — | 0.095 | 919 | 202 | 101.9 | 78.4 |
| 12 | 0.56 | 0.51 | 0.81 | 0.012 | — | 924 | 212 | 102.8 | 74.3 |
| 13 | 0.56 | 0.51 | 0.81 | 0.012 | — | 920 | 218 | 102.5 | 75.2 |
| 14 | 0.56 | 0.51 | 0.65 | 0.022 | — | 922 | 159 | 101.4 | 76.9 |
| 15 | 0.56 | 0.51 | 0.83 | 0.022 | — | 918 | 138 | 101.0 | 76.0 |

*Sulfur content not accurately measured.

TABLE VI

| | | | SIMULATED CYCLIC OPERATION | | | | |
|---|---|---|---|---|---|---|---|
| DAY | CYCLE NO. | AIR TREAT | ADD'L. TREAT-MENT | $N_2$ PURGE | $H_2$ TREAT | ADD'L. TREAT-MENT | $N_2$ PURGE |
| 1 | 1 | 11:00A.M. | | 11:55A.M. | 12:00 Noon | | 1:10 P.M. |
| | 2 | 1:15P.M. | | 1:40P.M. | 1:45 P.M. | | 2:10 P.M. |
| | 3 | 2:15P.M. | | 3:10P.M. | 3:15 P.M. | | 3:40 P.M. |
| | 4 | 3:45P.M. | | 4:10P.M. | 4:15 P.M. | | 8:00 A.M. |
| 2 | 5 | 8:05A.M. | | 8:25A.M. | 8:30 A.M. | A | 9:05 A.M. |
| | 6 | 9:10A.M. | | 9:35A.M. | 9:40 A.M. | A | 10:25 A.M. |
| | 7 | 10:30A.M. | | 10:55A.M. | 11:00 A.M. | A | 11:35 A.M. |
| | 8 | 11:40A.M. | | 11:55A.M. | 12:00 Noon | A | 12:35 P.M. |
| | 9 | 12:40A.M. | | 1:50P.M. | 2:00 P.M. | | 2:45 P.M. |
| | 10 | 2:50P.M. | | 3:15P.M. | 3:20 P.M. | | 3:45 P.M. |
| 2–6 | 11 | 3:50P.M. | | 4:20P.M. | 4:25 P.M. | A | 8:30 A.M. |

TABLE VI -Continued

| DAY | CYCLE NO. | AIR TREAT | ADD'L. TREATMENT | SIMULATED CYCLIC OPERATION $N_2$ PURGE | $H_2$ TREAT | ADD'L. TREATMENT | $N_2$ PURGE |
|---|---|---|---|---|---|---|---|
| | Catalyst left in flowing hydrogen (50 cc/min.) for 88 hrs. | | | | | | |
| 6 | 12 | 8:35A.M. | | 9:15A.M. | 9:20A.M. | | 9:40A.M. |
| | 13 | 9:45A.M. | | 10:15A.M. | 10:20A.M. | A | 11:55A.M. |
| | 14 | 12:00Noon | | 1:15P.M. | 1:20P.M. | | 1:55P.M. |
| | 15 | 2:00P.M. | | 3:15P.M. | 3:20P.M. | | 3:45P.M. |
| | 16 | 3:50P.M. | | 4:05P.M. | 4:10P.M. | A | 8:15A.M. |
| 7 | 17 | 8:20A.M. | | 8:45A.M. | 8:50A.M. | | 9:10A.M. |
| | 18 | 9:15A.M. | | 9:35A.M. | 9:40A.M. | | 10:00A.M. |
| | 19 | 10:05A.M. | | 10:20A.M. | 10:25A.M. | | 10:35A.M. B* |
| | 20 | 10:40A.M. | | 11:00A.M. | 11:05A.M. | A | 11:35A.M. |
| | 21 | 11:40A.M. | | 12:40P.M. | 12:45P.M. | | 1:25P.M. |
| | 22 | 1:30P.M. | | 1:55P.M. | 2:00P.M. | B | 2:30P.M. |
| | 23 | 2:35P.M. | C | 2:55P.M. | 3:00P.M. | | 3:15P.M. |
| | 24 | 3:20P.M. | | 3:35P.M. | 3:40P.M. | | 3:55P.M. |
| | 25 | 4:00P.M. | | 4:15P.M. | 4:20P.M. | | 8:05A.M. |
| 8 | 26 | 8:10A.M. | | 8:35A.M. | 8:40A.M. | A | 9:00A.M. B* |
| | 27 | 9:05A.M. | C | 9:20A.M. | 9:25A.M. | | 9:40A.M. |
| | 28 | 9:45A.M. | | 9:55A.M. | 10:00A.M. | A | 10:15A.M. |
| | 29 | 10:20A.M. | B | 10:40A.M. | 10:45A.M. | | 11:00A.M. |
| | 30 | 11:05A.M. | C | 11:20A.M. | 11:25A.M. | | 11:50A.M. |
| | 31 | 11:55A.M. | | 12:35P.M. | 12:40P.M. | A | 12:55P.M. |
| | 32 | 1:00P.M. | C | 1:15P.M. | 1:20P.M. | | 2:10P.M. |
| | 33 | 2:15P.M. | | 2:35P.M. | 2:40P.M. | A | 2:55P.M. |
| | 34 | 3:00P.M. | | 3:15P.M. | 3:20P.M. | A | 3:40P.M. |
| | 35 | 3:45P.M. | C | 4:15P.M. | 4:20P.M. | | 8:05A.M. |

A = 10 cc $H_2$S;
B = 2 cc $H_2$O;
C = 30 cc $Cl_2$
*Additional Treatment

At the end of Cycle No. 35, the reactor was purged with nitrogen, the catalyst was cooled in flowing nitrogen to approximately ambient temperature, and the catalyst was removed from the reactor tube. During the test, the flow rates of both the hydrogen and nitrogen were about 50 cubic centimeters per minute.

The catalyst, after the 35 cycles, was found to contain 0.015 weight percent selenium. Hence, during the 35 cycle, the catalyst lost only about one-third of its selenium content. This test demonstrates that the catalyst was able to retain a substantial amount of its selenium, even though it was subjected to a large number of varying atmospheres and conditions.

The data obtained from the above examples clearly show that a catalyst containing platinum, rhenium, and a small amount of selenium is a suitable reforming catalyst. Such catalyst provides both activity and selectivity that are at least equivalent to those furnished by prior-art reforming catalysts. The data also suggest that this catalyst will retain a substantial amount of selenium over a number of regeneration cycles. Since this catalyst is not sulfided prior to use in order to minimize excessive initial hydrocracking, there is no problem as to the proper distribution of sulfur on the catalyst. Hence, the catalyst of the present invention provides a reforming process having superior activity maintenance and selectivity maintenance without the necessity of sulfiding the catalyst, whether the catalyst be fresh or regenerated before use. The absence of a sulfiding pretreatment does not deleteriously affect the activity, selectivity, activity maintenance, or selectivity maintenance of the catalyst of the present invention.

What is claimed is:

1. A process for the reforming of a petroleum hydrocarbon fraction, which process comprises contacting said hydrocarbon fraction in a reforming zone under reforming conditions and in the presence of hydrogen with a catalytic composition consisting essentially of about 0.1 to about 5 weight percent Group VIII noble metal, about 0.1 to about 5 weight percent rhenium, and at least 0.005 weight percent selenium deposited on a solid catalytic support comprising a refractory inorganic oxide.

2. The process of claim 1 wherein said refractory inorganic oxide of said catalytic composition is a catalytically active alumina.

3. The process of claim 1 wherein said catalytic composition comprises also about 0.1 to about 5 weight percent combined halogen.

4. The process of claim 3 wherein said refractory inorganic oxide, said Group VIII noble metal, and said combined halogen of said catalytic composition are respectively a catalytically active alumina, platinum, and combined chlorine.

5. The process of claim 1 wherein said reforming conditions comprise an inlet temperature of about 750°F. to about 1,100°F., a total pressure of about 50 psig to about 1,000 psig, a WHSV of about 0.1 to about 10 weight units of hydrocarbon per hour per weight unit of catalyst, and a recycle gas rate of about 1,000 SCFB to about 20,000 SCFB.

6. The process of claim 2 wherein said reforming conditions comprise an inlet temperature of about 750°F. to about 1,100°F., a total pressure of about 50 psig to about 1,000 psig, a WHSV of about 0.1 to about 10 weight units of hydrocarbon per hour per weight unit of catalyst, and a recycle gas rate of about 1,000 SCFB to about 20,000 SCFB.

7. The process of claim 3 wherein said reforming conditions comprise an inlet temperature of about 750°F. to about 1,100°F., a total pressure of about 50 psig to about 1,000 psig, a WHSV of about 0.1 to about 10 weight units of hydrocarbon per hour per weight unit of catalyst, and a recycle gas rate of about 1,000 SCFB to about 20,000 SCFB.

8. The process of claim 4 wherein said reforming conditions comprise an inlet temperature of about 750°F. to about 1,100°F., a total pressure of about 50 psig to about 1,000 psig, a WHSV of about 0.1 to about 10 weight units of hydrocarbon per hour per weight unit of catalyst, and a recycle gas rate of about 1,000 SCFB to about 20,000 SCFB.

* * * * *